United States Patent [19]

Stingelin

[11] Patent Number: 5,010,190
[45] Date of Patent: Apr. 23, 1991

[54] CATIONIC COMPOUNDS

[75] Inventor: Willy Stingelin, Reinach, Switzerland

[73] Assignee: Ciba-Geigy Corporation, Ardsley, N.Y.

[21] Appl. No.: 192,316

[22] Filed: May 9, 1988

[30] Foreign Application Priority Data

May 20, 1987 [CH] Switzerland ............... 1941/87

[51] Int. Cl.$^5$ ............... C07D 401/04; C07D 403/04
[52] U.S. Cl. ............... 544/198; 544/212; 544/207; 544/209; 544/219; 544/113; 544/83
[58] Field of Search ............... 544/212, 207, 209, 219, 544/198, 113, 83

[56] References Cited

U.S. PATENT DOCUMENTS 4,380,627 4/1983 Stingelin et al. ............... 542/423
4,462,805 7/1984 Stingelin et al. ............... 8/436
4,652,645 3/1987 Stingelin et al. ............... 544/198

OTHER PUBLICATIONS

Stingelin et al., Chemical Abstracts, vol. 103, Entry 125017n (1985).

Primary Examiner—John M. Ford
Attorney, Agent, or Firm—Edward McC. Roberts

[57] ABSTRACT

The invention relates to novel cationic compounds of formula

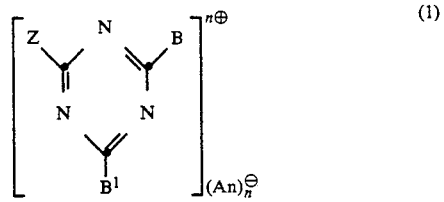

wherein
Z is a radical of formula

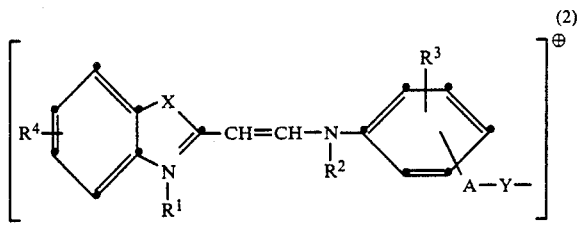

B and $B^1$ are each independently of the other a radical Z, a cationic radical different from Z or a radical of formula

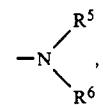

$R^1$ is unsubstituted $C_1$–$C_6$alkyl or $C_3$–$C_4$-alkenyl,
$R^2$ is unsubstituted or substituted $C_1$–$C_6$alkyl,
$R^3$ and $R^4$ are each independently of the other hydrogen, unsubstituted or substituted $C_1$–$C_4$alkyl, unsubstituted or substituted $C_1$–$C_4$alkoxy, —$NO_2$, unsubstituted or substituted acylamino, halogen or —CN,
$R^5$ is hydrogen, unsubstituted or substituted $C_1$–$C_6$alkyl, $C_3$–$C_6$alkenyl or aryl,
$R^6$ is hydrogen, unsubstituted or substituted $C_1$–$C_6$alkyl, $C_3$–$C_6$alkenyl or aryl, or $R^5$ and $R^6$, together with the linking nitrogen atom, are a heterocyclic radical,
X is a sulfur atom or the group

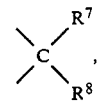

wherein $R^7$ and $R^8$ are each independently of the other $C_1$–$C_6$alkyl or $C_3$–$C_4$alkenyl or can also be linked to each other to form a 5- or 6-membered carbocyclic ring,
A is a direct bond, —NH—$C_1$–$C_4$alkylene, —O—$C_1$–$C_4$alkylene, $C_1$–$C_4$alkylene, phenylene, —O—phenylene or —NH—phenylene,
Y is —NH—, —$NR^1$, —O— or —S—,
n is 1, 2 or 3, and
$An^\ominus$ is an anion.

These compounds are suitable for use as dyes for dyeing and printing textile materials, for example polyacrylonitrile, cellulose or, in particular, paper. Greenish to reddish yellow dyeings are obtained.

15 Claims, No Drawings

CATIONIC COMPOUNDS

The present invention relates to novel cationic compounds, to their preparation and to the use thereof for dyeing and printing textile materials, leather and paper.

The novel cationic compounds have the formula

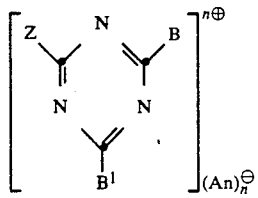

wherein
Z is a radical of formula

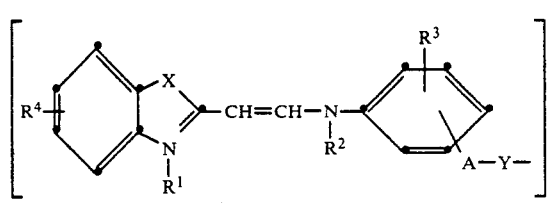

B and $B^1$ are each independently of the other a radical Z, a cationic radical different from Z or a radical of formula

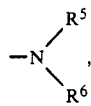

$R^1$ is unsubstituted $C_1$-$C_6$-alkyl or $C_3$-$C_4$-alkenyl,
$R^2$ is unsubstituted or substituted $C_1$-$C_6$-alkyl,
$R^3$ and $R^4$ are each independently of the other hydrogen, unsubstituted or substituted $C_1$-$C_4$alkyl, unsubstituted or substituted $C_1$-$C_4$alkoxy, —$NO_2$, unsubstituted or substituted acylamino, halogen or —CN,
$R^5$ is hydrogen, unsubstituted or substituted $C_1$-$C_6$alkyl, $C_3$-$C_6$alkenyl or aryl,
$R^6$ is hydrogen, unsubstituted or substituted $C_1$-$C_6$alkyl, $C_3$-$C_6$alkenyl or aryl, or $R^5$ and $R^6$, together with the linking nitrogen atom, are a heterocyclic radical,
X is a sulfur atom or the group

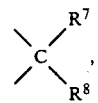

wherein $R^7$ and $R^8$ are each independently of the other $C_1$-$C_6$alkyl or $C_3$-$C_4$alkenyl or can also be linked to each other to form a 5- or 6-membered carbocyclic ring,
A is a direct bond, —NH—$C_1$—$C_4$alkylene, —O—$C_1$-$C_4$alkylene, $C_1$-$C_4$alkylene, phenylene, —O-phenylene or —NH-phenylene,
Y is —NH—, —$NR^1$, —O— or —S—,
n is 1, 2 or 3, and
$An^\ominus$ is an anion.

Throughout this specification, alkyl will be understood as meaning unbranched or branched alkyl and is, typically, methyl, ethyl, n- or isopropyl, n-butyl, sec-butyl or tert-butyl, straight chain or branched pentyl or hexyl; and also comprises cyclic alkyl groups such as cyclopentyl, cyclohexyl or methylcyclohexyl.

These groups can be substituted, for example by $C_1$-$C_4$alkoxy such as methoxy, ethoxy, n- and isopropoxy or n- and iso-butoxy; by —CN, halogen such as fluorine, chlorine or bromine; by phenyl (which in turn is unsubstituted or further substituted by, for example, alkyl and/or alkoxy), by —$CONH_2$ or by a carboxamide group which carries one or two substituents (for example $C_1$-$C_4$alkyl) at the N-atom.

$C_1$-$C_4$Alkoxy groups are unbranched or branched alkoxy groups such as methoxy, ethoxy, n- and isopropoxy or n- and isobutoxy, which groups can be further substituted, for example by phenyl.

B or $B^1$ as a cationic radical different from Z can be, for example, a radical of formula:

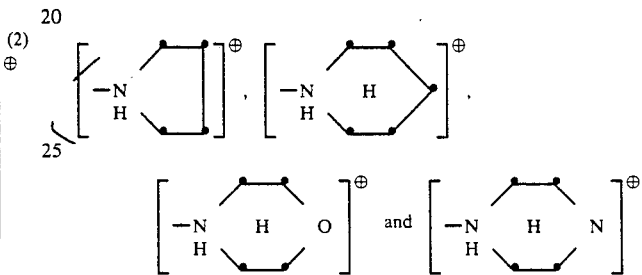

and preferably;

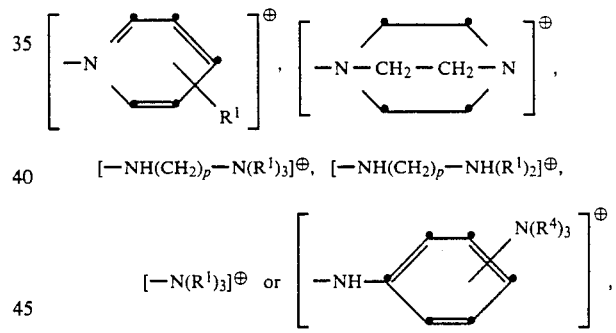

$[-NH(CH_2)_p-N(R^1)_3]^\oplus$, $[-NH(CH_2)_p-NH(R^1)_2]^\oplus$,

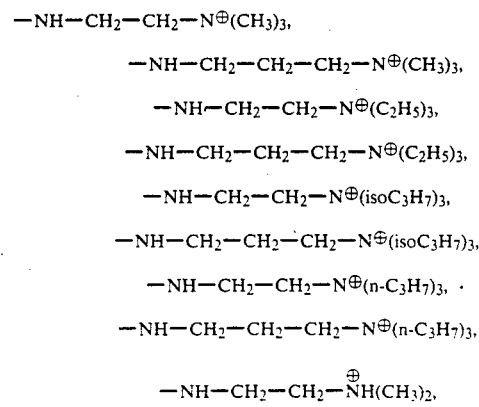

wherein the substituents $R^1$ and $R^4$ have the given meanings and p is 2 or 3.

or $B^1$ as a $[-NH(CH_2)_p-N(R^1)_3]^\oplus$ or $[-NH(CH_2)_p-NH(R^1)_2]^\oplus$ group denotes, for example the following groups:

—NH—$CH_2$—$CH_2$—$N^\oplus(CH_3)_3$,

—NH—$CH_2$—$CH_2$—$CH_2$—$N^\oplus(CH_3)_3$,

—NH—$CH_2$—$CH_2$—$N^\oplus(C_2H_5)_3$,

—NH—$CH_2$—$CH_2$—$CH_2$—$N^\oplus(C_2H_5)_3$,

—NH—$CH_2$—$CH_2$—$N^\oplus(isoC_3H_7)_3$,

—NH—$CH_2$—$CH_2$—$CH_2$—$N^\oplus(isoC_3H_7)_3$,

—NH—$CH_2$—$CH_2$—$N^\oplus(n-C_3H_7)_3$,

—NH—$CH_2$—$CH_2$—$CH_2$—$N^\oplus(n-C_3H_7)_3$,

—NH—$CH_2$—$CH_2$—$\overset{\oplus}{N}H(CH_3)_2$,

-continued

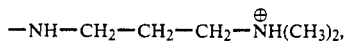
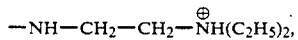
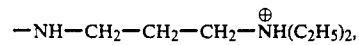
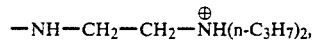
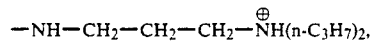
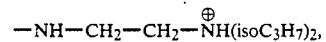
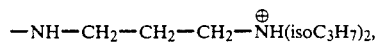
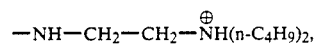
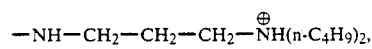
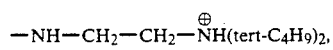
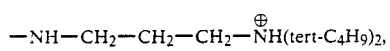
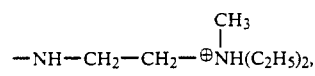
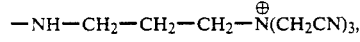
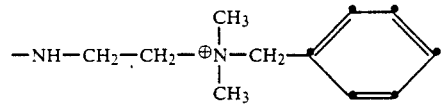
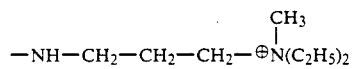
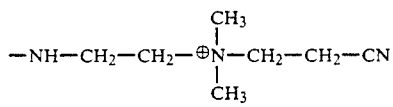
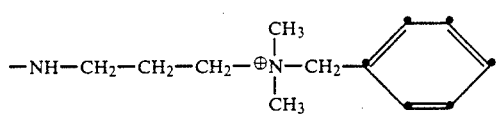
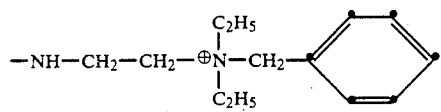
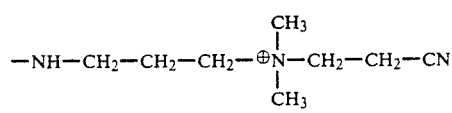
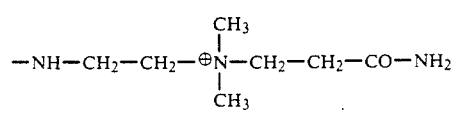

-continued

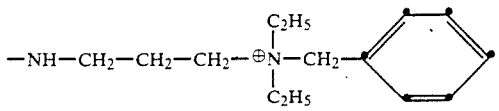

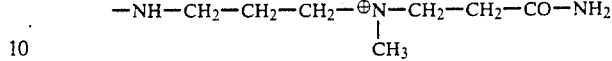

As a $[-N(R^1)_3]^\oplus$ group, B is, for example, a group selected from

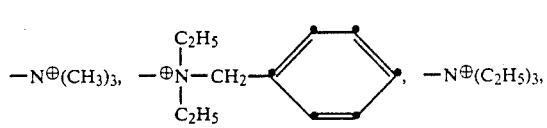

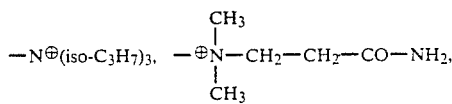

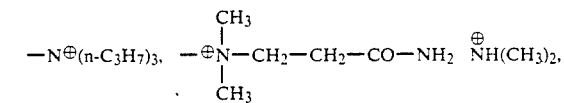

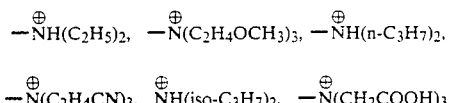

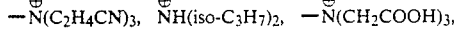

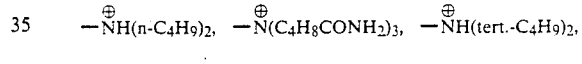

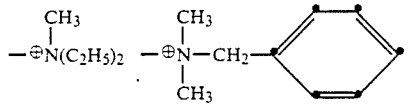

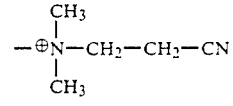

Where B or $B^1$ is a radical of formula

$R^5$ and $R^6$ as aryl are, for example, phenyl or naphthyl. A heterocyclic radical $-NR^5R^6$ is, for example, a 5- or 6-membered heterocycle such as thiazole, imidazole, pyrazole, triazole, pyrrolidine, piperazine, piperidine or morpholine.

The aryl radical as well as the heterocyclic radical may also be substituted, for example by $C_1$-$C_4$alkyoxy, $C_1$-$C_4$alkyl, —OH, halogen (fluorine, chlorine or bromine —$NO_2$, —CN, —NH—$C_1$-$C_4$alkyl, N(alkyl)$_2$, $[\oplus N(alkyl)_3]An\ominus$ and —$NH_2$.

A $C_1$-$C_6$alkyl radical $R^5$ or $R^6$ can be interrupted in the chain by one or more identical or different members selected from —O—, —S— and —NH—. Said alkyl radical can be unbranched or branched and also substituted.

$R^5$ or $R^6$ as $C_3$-$C_6$alkenyl can be, for example, —CH$_2$—CH=CH$_2$ or —CH$_2$—CH=CH—CH$_3$.

The $C_1$-$C_6$alkyl and $C_1$-$C_6$alkenyl radical can be substituted, for example by —OH, halogen (fluorine, chlorine or bromine), —NO$_2$, —CN, NH—$C_1$-$C_4$-alkyl, N($C_1$-$C_4$alkyl)$_2$ and $[-N(R^1)_3]^\oplus$.

Preferably $R^5$ is hydrogen, phenyl or phenyl which is substituted by $C_1$-$C_4$alkyl, $C_1$-$C_4$alkoxy, chlorine, nitro, —NH—$C_1$-$C_4$alkyl or —CN.

The preferred meaning of $R^6$ is hydrogen.

Preferred dyes of formula (1) are those in which B is a radical Z and $B^1$ is a cationic radical or a radical of formula

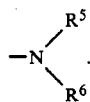

The most preferred dyes of formula (1), however, are those in which B and $B^1$ are each a radical Z and, among these dyes, especially those in which the three radicals Z are identical.

An acylamino group $R^3$ or $R^4$ may be, for example, the benzoylamino or acetylamino group. The acylamino group can be substituted by, for example, halogen such as fluorine, chlorine or bromine, or by a —NH$_2$ group or an amino group which is substituted at the N-atom by one or two $C_1$-$C_4$alkyl groups.

$R^3$ or $R^4$ as halogen is preferably fluorine, chlorine or bromine.

The substituent $R^3$ or $R^4$ may occur more than once in one and the same benzene ring.

In the preferred cationic compounds of formula (1), $R^3$ and $R^4$ are each independently of the other hydrogen or an unsubstituted, unbranched $C_1$-$C_4$alkyl group, preferably the methyl group, or an unsubstituted, unbranched $C_1$-$C_4$alkoxy group, preferably the methoxy group, or halogen, preferably chlorine.

$R^1$, $R^7$ or $R^8$ as an alkenyl group is preferably the allyl group.

In the preferred cationic compounds of formula (1), $R^1$ is an unsubstituted, unbranched $C_1$-$C_4$alkyl group, preferably the —CH$_3$ group.

X as the

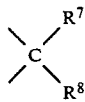

group, wherein $R^7$ and $R^8$ are linked together to form a 5- or 6-membered carbocyclic ring, is preferably the unsubstituted cyclopentane or cyclohexane ring.

In the preferred cationic compounds of formula (1), X is

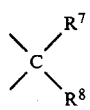

group, wherein $R^7$ and $R^8$ are each an unbranched, unsubstituted $C_1$-$C_4$-alkyl radical. Most preferably, X is the

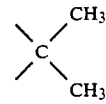

group.

$R^2$ is preferably an unsubstituted $C_1$-$C_4$alkyl group or benzyl and, most preferably, methyl or ethyl.

Suitable alkylene bridges for A as a $C_1$-$C_4$alkylene, —NH—$C_1$-$C_4$alkylene or —O—$C_1$-$C_4$alkylene bridge are, for example, methylene, ethylene, n- and isopropylene or n- or isobutylene.

In the preferred cationic compounds of formula (1), A is attached in m- or, preferably, p-position to the —CH=CH—NR$^2$ bridge and is either a direct bond or —O—phenylene or —NH—phenylene. Preferably A is a direct bond, i.e. the radical Y is attached direct to the phenylene radical and the triazine radical.

Y as a —NR$^1$ group is a —N—$C_1$-$C_6$alkyl group such as the —N—CH$_3$, —N—$C_2$H$_5$ or —N—$C_3$H$_7$ group, in which the alkyl moiety can be substituted as defined herein, preferably by —CN or halogen.

In the preferred cationic compounds of formula (1), Y is the —NH or —NR$^1$ group, especially the —N—CH$_3$ group.

Suitable anions An are inorganic as well as organic anions, for example: halides such as chloride, bromide or iodide ions, sulfate, methylsulfate, aminosulfate, perchlorate, carbonate, bicarbonate, phosphate, phosphoromolybdate, phosphorotungstate, phosphorotungstomolybdate, benzenesulfonate, 4-chlorobenzenesulfonate, naphthalenesulfonate, oxalate, maleate, formate, acetate, propionate, lactate, succinate, chloroacetate, tartrate, methanesulfonate or benzoate ions or complex anions, in particular those of chlorozinc double salts.

Preferred anions A are the formate, acetate, lactate, chloride, sulfate and phosphate ion.

By way of explanation, it must be emphasised that, where B or $B^1$ has the significance of Z, both radicals Z need not be identical.

Where B and $B^1$ are a cationic radical or a radical of formula

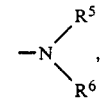

then in this case too both radicals can be identical or different from each other. In addition, the substituents $R^5$ and $R^6$ can, as already stated, be substituted by cationic groups, so that compounds of formula (1) which contain several cationic groups are obtained.

A particularly preferred embodiment of the invention comprises the dyes of formula

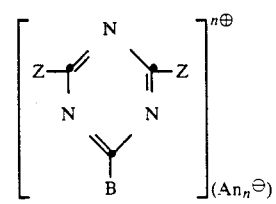

(3)

wherein

Z is a radical of formula

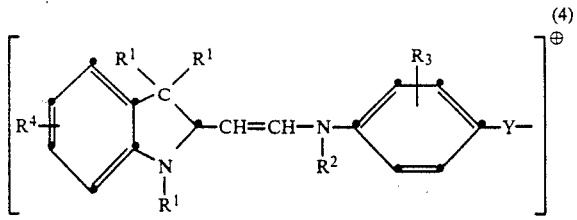 (4)

B is a radical Z or a radical of formula

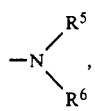, $R^1$ is unsubstituted $C_1$-$C_4$alkyl,
$R^2$ is unsubstituted $C_1$-$C_4$alkyl or benzyl,
$R^3$ and $R^4$ are each independently of the other hydrogen, $C_1$-$C_4$alkyl, $C_1$-$C_4$alkoxy or chlorine,
$R^5$ is hydrogen, phenyl or phenyl which is substituted by $C_1$-$C_4$alkyl, $C_1$-$C_4$alkoxy, chlorine, nitro, —NH—$C_1$-$C_4$alkyl, or —CN,
$R^6$ is hydrogen or unsubstituted $C_1$-$C_4$alkyl,
Y is —NH, or —NR$^1$,
n is 2 or 3, and
An$^\ominus$ is an anion.

The novel cationic compounds of formula (1) are greenish to reddish yellow compounds. They can be prepared in a manner known per se.

Compounds of formula (1), wherein B and $B^1$ are each a radical Z, are obtained, for example, by reacting 1 mole of a compound of formula

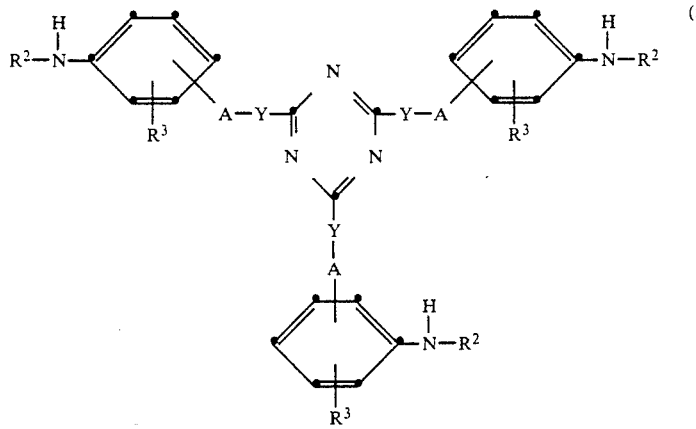 (5)

with 3 moles of an aldehyde compound of formula

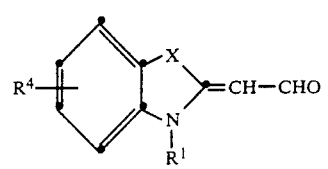 (6)

in the presence of an acid HAn, in which formulae (5) and (6) above the substituents $R^1$, $R^2$, $R^3$, $R^4$, A, Y, X and An are as defined for formula (1).

Compounds of formula (1), wherein B and $B^1$ are not identical with Z, are obtained, for example, by condensing 1 mole of a compound of formula (5) with 1 mole of an aldehyde of formula (6) to give compounds of formula (1), wherein B and $B^1$ are each a radical of formula

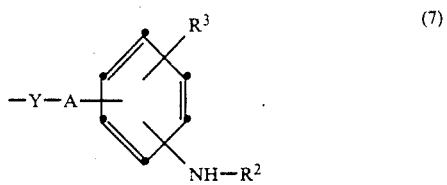 (7)

In like manner, those compounds of formula (1), wherein B is a radical of formula (7) and $B^1$ is Z, are obtained by reacting 1 mole of a compound of formula (5) with 2 moles of an aldehyde of formula (6). Both these last mentioned reactions, however, normally do not yield homogeneous compounds, but mixtures of compounds containing one, two or three radicals Z.

It is preferred to react 1 mole of the compound of formula (5) with 2.5 to 2.99 moles, most preferably 2.8 to 2.99 moles, of an aldehyde of formula (6). A small excess of the compound of formula (5) is thus employed.

Compounds of formula (1), wherein B and $B^1$ are not identical with Z, can also be obtained, for example, by condensing 1 mole of a compound of formula

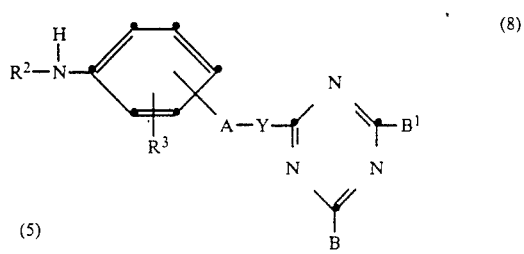 (8)

with 1 mole of an aldehyde of formula (6) in the presence of an acid HAn, where $R^2$, $R^3$, A, Y, B, $B^1$ and An are as defined for formula (1).

In similar manner, compounds of formula (1), wherein B is Z and $B^1$ is not identical with Z, are obtained, for example, by condensing 1 mole of a compound of formula

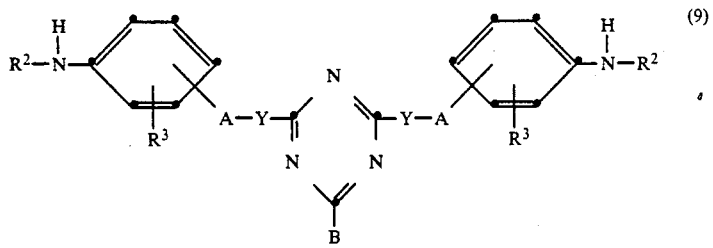

with 2 moles of an aldehyde of formula (6) in the presence of an acid HAn.

The amines of formulae (5), (8) and (9) are known or can be obtained by methods which are known per se.

For example, the compounds of formula (5) are obtained by reacting 1 mole of s-trichlorotriazine with 3 moles of a compound of formula

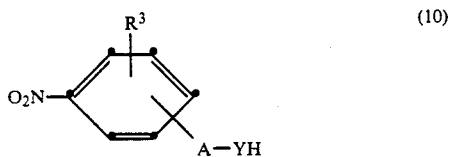

subsequently reducing the —$NO_2$ group in the condensate to the —$NH_2$ group and then introducing the group $R^2$ by reaction with a suitable alkylating agent.

The compounds of formula (8) are obtained, for example, by reacting s-trichlorotriazine stepwise with a compound HB and $HB^1$ to give a compound of formula

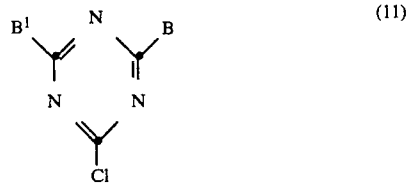

then reacting this compound with a compound of formula (10) to a compound of formula

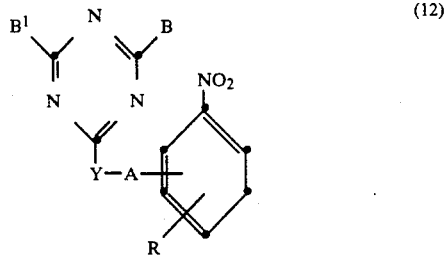

subsequently reducing the —$NO_2$ to the —$NH_2$ group and condensing the intermediate reduction product with 1 mole of an aldehyde of formula (6) in the presence of an acid HAn.

The compounds of formula (9) are obtained in similar manner, for example by reacting s-trichlorotriazine first with 2 moles of a compound of formula (10) and then with 1 mole of a compound B—H, subsequently reducing the —$NO_2$ group in the condensate and introducing the group $R^2$ by reaction with a suitable alkylating agent.

The compounds of formula (10) and the aldehydes of formula (6) are also known or can be obtained in a manner which is known per se.

Examples of suitable aldehydes of formula (6) are:
1,3,3-trimethyl-2-methylene-indoline-ω-aldehyde,
1,3,3-trimethyl-5-chloro-2-methylene-indoline-ω-aldehyde,
1,3,3-trimethyl-5-phenyl-2-methylene-indoline-ω-aldehyde, and
1,3,3-trimethyl-5-cyano-2-methylene-indoline-ω-aldehyde.

The condensation reactions of the compounds (5), (8) and (9) with the aldehyde of formula (6) are carried out in known manner, for example in aqueous medium or in an organic solvent in the temperature range from about 0° to 100° C. and in the presence of an acid HAn. Said acid HAn is an organic acid such as acetic acid or arylsulfonic acid, preferably benzenesulfonic acid, or is an inorganic acid such as hydrochloric acid, sulfuric acid or phosphoric acid.

After the condensation reaction, the novel cationic compounds are, if desired, separated from the reaction medium and dried.

Another method of obtaining the compounds of formula (1) comprises starting from compounds which contain hydrogen instead of the group $R^2$ and otherwise have the formula (1), and introducing the radical $R^2$ into these compounds. The suitable starting compounds are known, for example from European patent applications 38 299, 94 642 and 145 656.

Compared with the compounds disclosed in the above publications, the compounds of this invention which contain the group $R^2$ instead of hydrogen have the advantage that they are stable even at higher pH values. This feature enables them to be used in dyeing processes at pH values of, for example, up to ca. 9.

If desired or necessary, the anion An in the cationic compounds of formula (1) can be replaced by another anion in known manner.

It is also possible, however, to convert the novel compounds direct into a liquid commercial form after concentration of the reaction mixture.

The novel cationic compounds of formula (1) are used as dyes for dyeing or, with the aid of binders and optionally solvents, for printing materials which are dyeable with cationic dyes, especially textile materials which for example consist of homopolymers or copolymers of acrylonitrile, or synthetic polyamides or polyesters which are modified by acid groups. Dyeing is preferably carried out in aqueous, neutral or acid medium by the exhaust process, at normal pressure or under pressure, or by the continuous process. The textile material may be in any form of presentation, for example as fibres, filaments, woven goods, knitted goods, piece goods and finished articles such as shirts or pullovers.

Level greenish to reddish yellow dyeings or prints of very good all-round fastness properties can be obtained by application of the dyes.

Further, the novel cationic dyes can also be used for dyeing and printing natural and regenerated cellulosic material, especially cotton and viscose. In this case too, strong greenish to reddish yellow dyeings are obtained. The novel dyes have good affinity for these textile materials, a good degree of exhaustion, and the dyeings obtained have very good fastness properties, in particular wetfastness properties.

A further preferred utility of the novel cationic dyes of formula (1) is that of dyeing paper of all kinds, especially bleached, unsized and sized lignin-free paper. Most particularly, these dyes are suitable for dyeing unsized paper (tissues) owing to their very pronounced affinity for this substrate.

The novel compounds exhaust very well onto these substrates, leaving the wastewaters almost colourless.

The resultant dyeings are wetfast, i.e. they have no tendency to bleed when dyed paper in the wet state is contacted with moist white paper. This property is particularly desirable for tissues which, in the wet state (e.g. impregnated with water, alcohol, surfactant solutions etc.), are likely to come in contact with other substrates such as textiles, paper and the like, which must be protected against soiling.

The excellent affinity for paper and the very rapid rate of exhaustion of the novel dyes is of great advantage for the continuous dyeing of paper and permits a much broader use of this known economic process. To be singled out for special mention is their stability at pH values above 7, for example at pH values up to 9.

The novel dyes can be applied by a wide range of different processes to the paper material, e.g. in pulp dyeing, in the size press and from aqueous inks by the INK JET method.

Further, the dyes of the present invention can also be used for dyeing leather (e.g. by spray dyeing, brushing and dipping) and for the preparation of inks.

The invention is illustrated by the following non-limitative Examples. Parts and percentages are by weight.

The abbreviation "RKN" is a quality description and indicates the degree of purity of the cellulose; the abbreviation "SR" (Schopper-Riegler) indicates the freeness.

EXAMPLE 1

9.1 parts of 2,4,6-s-tris(4'-N-methylamino-phenylamino)triazine and 12.0 parts of 1,3,3-trimethyl-2-methyleneindoline-ω-aldehyde are stirred in 60 parts of methanol and 3.9 parts of 85% formic acid at 20°–25° C. The condensation is complete after 10 hours and the methanol is removed by vacuum distillation, affording 22.0 parts of a brown dye powder of the following formula

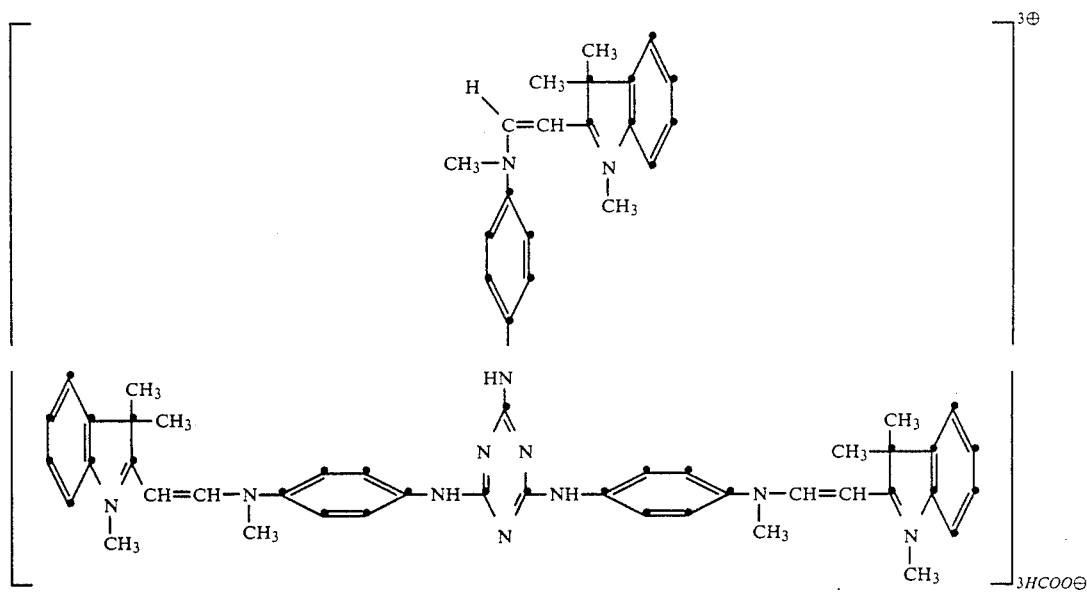

This dye colours paper in a brilliant greenish yellow shade.

EXAMPLE 2

The dye cation of the formula of Example 1 can also be obtained by quaternisation, with dimethyl sulfate in water, of the dye base of formula

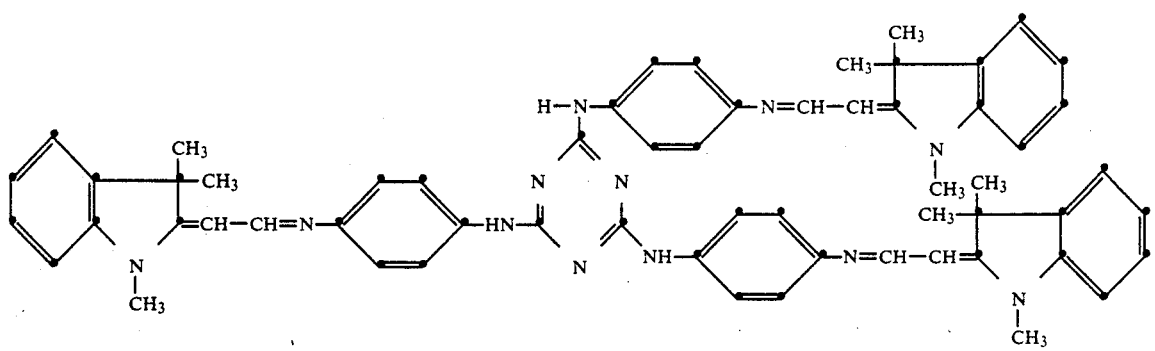

The preparation of the dye base is described in European patent application 38 299.

EXAMPLES 3-13

Cationic dyes which colour paper in greenish yellow shades are obtained by the procedure described in Example 1 using the components listed in the following Table.

| Ex. | R | Z | B¹ | B |
|---|---|---|---|---|
| 3 | H | —HN—⟨⟩—N—H with C₂H₅ on N | Z | Z |
| 4 | H | —HN—⟨⟩—N—H with OCH₃ and CH₃ | Z | Z |
| 5 | H | CH₃O—⟨⟩—NH, —N—H with CH₃ | Z | Z |
| 6 | H | —HN—⟨⟩—N—H with CH₃ | Z | —NH—⟨⟩ |
| 7 | H | —HN—⟨⟩—N—H with CH₃ | Z | —NH—⟨⟩ with CH₃, CH₃ |
| 8 | Cl | —HN—⟨⟩—N—H with CH₃ | Z | Z |
| 9 | H | —HN—⟨⟩—N—H with CH₃ | Z | —NH₂ |

-continued
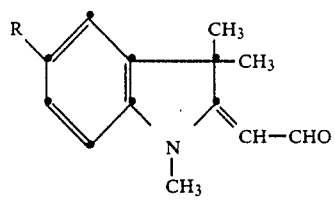 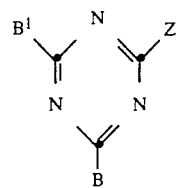
| Ex. | R | Z | B¹ | B |
|---|---|---|---|---|
| 10 | H | —HN—C₆H₄—N(CH₃)—H | Z | Z |
| 11 | H | —HN—C₆H₄—N(CH₃)—H | Z | —NH—C₆H₅ |
| 12 | H | —HN—C₆H₄—N(CH₃)—H | —NH—C₆H₅ | —NH—C₆H₅ |
| 13 | H | —HN—C₆H₄—N(CH₃)—H | —NH—C₆H₅ | —NH₂ |
| 14 | H | —HN—C₆H₄(CH₃)—N—H | Z | —HN—C₆H₄(CH₃)—N—H |
| 15 | H | —HN—C₆H₄(CH₃)—N—H | —HN—C₆H₄(CH₃)—N—H | B¹ |
| 16 | Cl | —HN—C₆H₄(CH₃)—N—H | —HN—C₆H₃(CH₃)(CH₃)—N—H | B¹ |
| 17 | H | —HN—C₆H₄(CH₃)—N—H | —HN—C₆H₃(OCH₃)(CH₃)—N—H | B¹ |
| 18 | Cl | —HN—C₆H₄(CH₃)—N—H | —HN—C₆H₃(OCH₃)(CH₃)—N—H | B¹ |
| 19 | H | —HN—C₆H₄(CH₃)—N—H | Z | —N(CH₃)₂ |
| 20 | H | —HN—C₆H₄(CH₃)—N—H | Z | —N(C₂H₅)₂ |
| 21 | H | —HN—C₆H₄(CH₃)—N—H | Z | —N(C₃H₇)₂ |

-continued

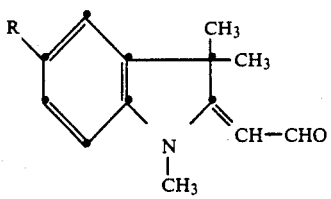

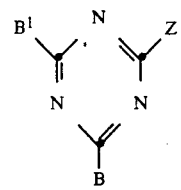

| Ex. | R | Z | B¹ | B |
|---|---|---|---|---|
| 22 | H | −HN−⟨pyrrole with CH$_3$⟩−N−H | Z | −NHC$_2$H$_5$ |
| 23 | H | −HN−⟨pyrrole with CH$_3$⟩−N−H | Z | −NHC$_3$H$_7$ |
| 24 | H | −HN−⟨pyrrole with CH$_3$⟩−N−H | Z | −NH(CH$_2$)$_3$N(CH$_3$)$_2$ |
| 25 | H | −HN−⟨pyrrole with CH$_3$⟩−N−H | Z | −NH(CH$_2$)$_3$N$^{\oplus}$(CH$_3$)$_3$ |
| 26 | H | −HN−⟨pyrrole with CH$_3$, CH$_3$⟩−N−H | Z | −NH(CH$_2$)$_3$N$^{\oplus}$(CH$_3$)$_3$ |

EXAMPLE 27

50 parts of chemically bleached beech sulfite are mixed with 50 parts of bleached cellulose RKN 15 (SR freeness 22°) and 2 parts of the dye of Example 1 in water (pH 6, water hardness 10° dH, temperature 20° C., liquor ratio 1:40). After stirring for 15 minutes, paper sheets are prepared on a Frank sheet former.

The paper is coloured in a very deep greenish yellow shade. The wastewater is completely colourless. The degree of exhaustion is almost 100%. The light- and wetfastness properties are excellent.

EXAMPLE 28

A paper web of bleached beech sulfite (22° SR) is prepared on a continuously operating laboratory paper machine. Ten seconds before the stock preparation, an aqueous solution of the dye of Example 1 is added continuously to the dilute pulp with vigorous turbulence (0.5% colouration, liquor ratio 1:400, water hardness 10° dH, pH 6, temperature 20° C.).

A strong yellow shade of average intensity is obtained on the paper web. The wastewater is completely colourless.

EXAMPLE 29

The procedure described in Example 28 is repeated, but at pH 8.5, to give a paper web which is coloured in the identical shade. The wastewater is completely colourless.

EXAMPLE 30

10 parts of cotton fabric (bleached mercerised cotton) are dyed in a laboratory beam dyeing machine in 200 parts of a liquor (water hardness 10° dH, pH 4, 3 circulations of the liquor per minute) which contains 0.05 part of the dye of Example 1.

The temperature is raised in the course of 60 minutes from 20° to 100° C., then kept constant for 15 minutes.

The dyebath is completely exhausted and the cotton fabric is dyed in an intense yellow shade of good lightfastness and very good wetfastness.

A textile fabric of regenerated cellulose (viscose) is dyed by the same procedure. The dye of Example 1 produces on this material a strong yellow dyeing of good lightfastness and very good wetfastness properties.

What is claimed is:

1. A cationic compound of formula

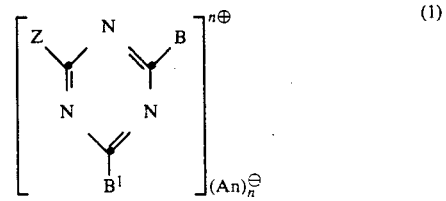

wherein
Z is a radical of formula

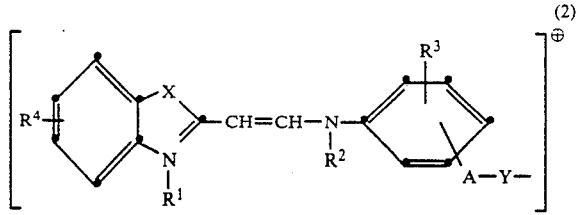 (2)

B and B¹ are each independently of the other a radical Z, a radical of the formula

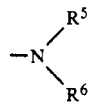

or a cationic radical different from Z selected from the group consisting of

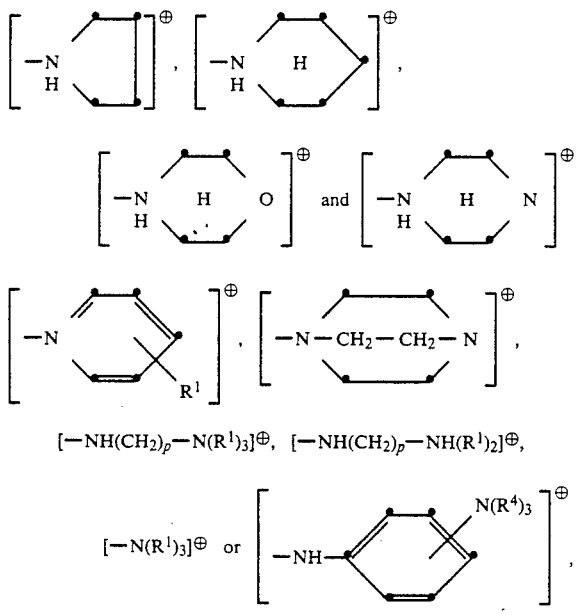

wherein R¹ and R⁴ are as defined below and p is 2 or 3,

R¹ is unsubstituted $C_1$-$C_6$alkyl or $C_3$-$C_4$alkenyl,

R² is unsubstituted or substituted $C_1$-$C_6$alkyl, wherein the substituent is $C_1$-$C_4$alkoxy, CN, halogen, phenyl, alkylphenyl, alkoxyphenyl, —CONH₂, —CO—N-H—$C_1$-$C_4$alkyl or —CO—N($C_1$-$C_4$alkyl)₂, R³ and R⁴ are each independently of the other (1) hydrogen, (2) unsubstituted or substituted $C_1$-$C_4$alkyl, wherein the substituent is $C_1$-$C_4$-alkoxy, CN, halogen, phenyl, alkylphenyl, alkoxyphenyl, —COHN₂, —CO—NH—$C_1$-$C_4$alkyl or —CO—N($C_1$-$C_4$alkyl)₂, (3) unsubstituted or substituted $C_1$-$C_4$alkoxy, wherein the substituent is phenyl, (4) nitro, (5) unsubstituted or substituted benzoylamino or acetylamin, wherein the substitutent is halogen, —NH₂, —NH—$C_1$-$C_4$alkyl or —N($C_1$-$C_4$alkyl)₂, (6) halogen or (7) —CN, R⁵ and R⁶ are each independently of the other hydrogen, unsubstituted or substituted $C_1$-$C_6$alkyl, wherein the substituent is $C_1$-$C_4$alkoxy, CN, halogen, phenyl, alkylphenyl, alkoxyphenyl, —CONH₂, —CO—N-H—$C_1$-$C_4$alkyl or —CO—N($C_1$-$C_4$alkyl)₂, $C_3$-$C_6$alkenyl, phenyl or naphthyl or R⁵ and R⁶, together with the linking nitrogen, are thiazole, imidazole, pyrazole, triazole, pyrrolidine, piperazine, piperidine or morpholine, X is a sulfur atom or the group

wherein R⁷ and R⁸ are each independently of the other $C_1$-$C_6$alkyl or $C_3$-$C_4$alkenyl or can also be linked to each other to form a 5- or 6-membered carbocyclic ring, A is a direct bond, —NH—$C_1$-$C_4$alkylene, —O—$C_1$-$C_4$alkylene, $C_1$-$C_4$alkylene, phenylene, —O—phenylene or —NH—phenylene, Y is —NH—, —NR¹, —O— or —S—, n is 1, 2 or 3, and An⊖ is an anion.

2. A cationic compound according to claim 2, wherein B and/or B¹ is a radical of formula

wherein R⁶ is hydrogen and R⁵ is hydrogen, phenyl or phenyl which is substituted by $C_1$-$C_4$alkyl, $C_1$-$C_4$alkoxy, chlorine, nitro, —NH—$C_1$-$C_4$alkyl or —CN.

3. A cationic compound according to claim 2, wherein B and/or B¹ is a radical Z.

4. A cationic compound according to claim 1, wherein R³ and R⁴ are each independently of the other hydrogen, an unsubstituted or substituted $C_1$-$C_4$alkyl or $C_1$-$C_4$alkoxy group, or halogen.

5. A cationic compound according to claim 4, wherein R³ and R⁴ are each independently of the other methyl, methoxy or chlorine.

6. A cationic compound according to claim 1, wherein R¹ is an unsubstituted $C_1$-$C_4$alkyl group.

7. A cationic compound according to claim 6, wherein R¹ is methyl.

8. A cationic compound according to claim 1, wherein X is the

group, wherein R⁷ and R⁸ are each independently of the other an unsubstituted $C_1$-$C_4$alkyl radical.

9. A cationic compound according to claim 1, wherein R⁷ and R⁸ are methyl.

10. A cationic compound according to claim 1, wherein R² is an unsubstituted $C_1$-$C_4$alkyl group or benzyl.

11. A cationic compound according to claim 1, wherein A is a direct bond, —O—phenylene- or —N-H—phenylene-.

12. A cationic compound according to claim 11, wherein A is a direct bond.

13. A cationic compound according to claim 1, wherein Y is the —NH— or —NR¹—group.

14. A cationic compound according to claim 1, wherein An is the formate, acetate, lactate, chloride, sulfate or phosphate ion.

15. A cationic compound of formula

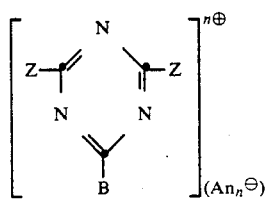 (3)

wherein

Z is a radical of formula

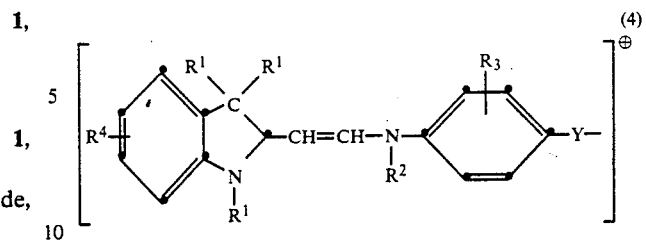 (4)

B is a radical Z or a radical of formula

R¹ is unsubstituted $C_1$-$C_4$alkyl,
R² is unsubstituted $C_1$-$C_4$Alkyl or benzyl,
R³ and R⁴ are each independently of the other hydrogen, $C_1$-$C_4$alkyl, $C_1$-$C_4$alkoxy or chlorine,
R⁵ is hydrogen, phenyl or phenyl which is substituted by $C_1$-$C_4$alkyl, $C_1$-$C_4$alkoxy, chlorine, nitro, —NH—$C_1$-$C_4$alkyl, or —CN,
R⁶ is hydrogen or unsubstituted $C_1$-$C_4$alkyl,
Y is —NH—, or —NR¹—,
n is 2 or 3, and
An⊖ is an anion.

* * * * *